(No Model.)
N. ROSSI.
POPCORN POPPER.
No. 588,186.      Patented Aug. 17, 1897.
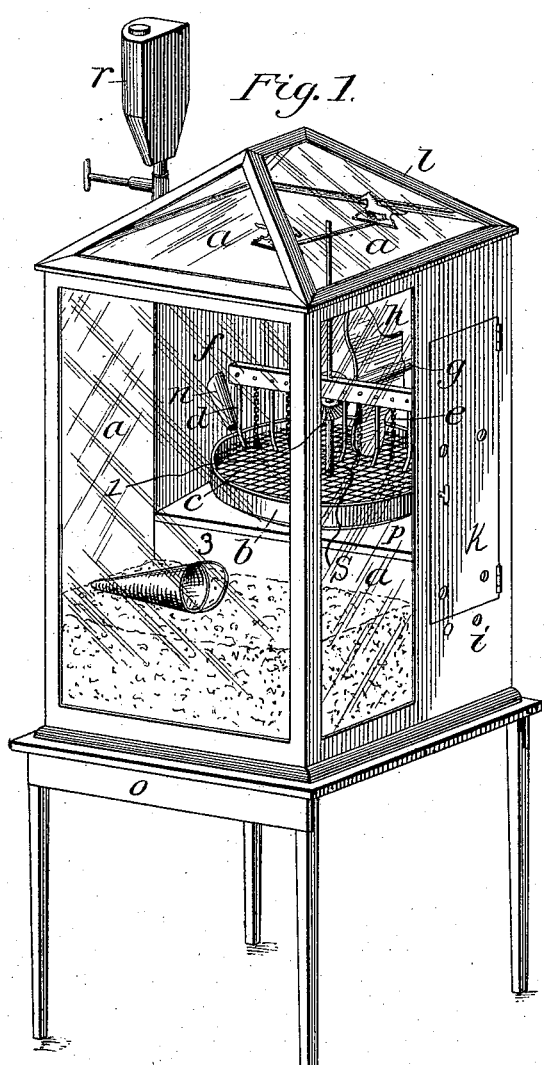
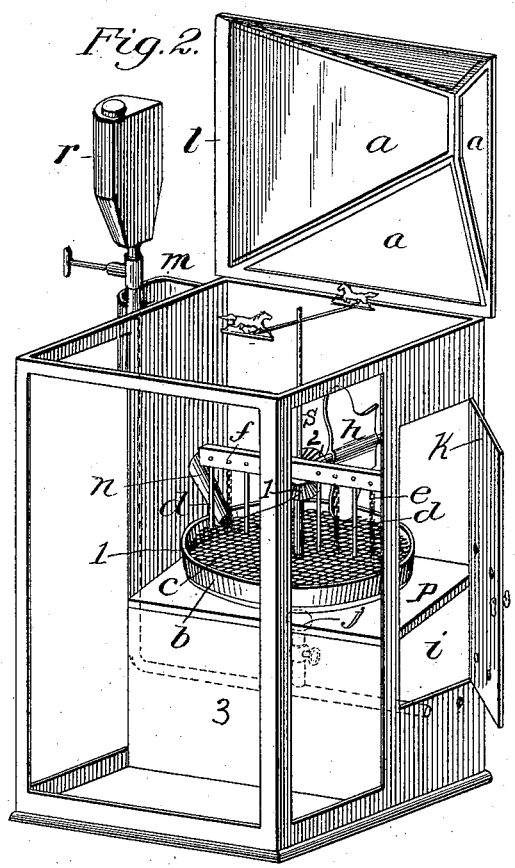
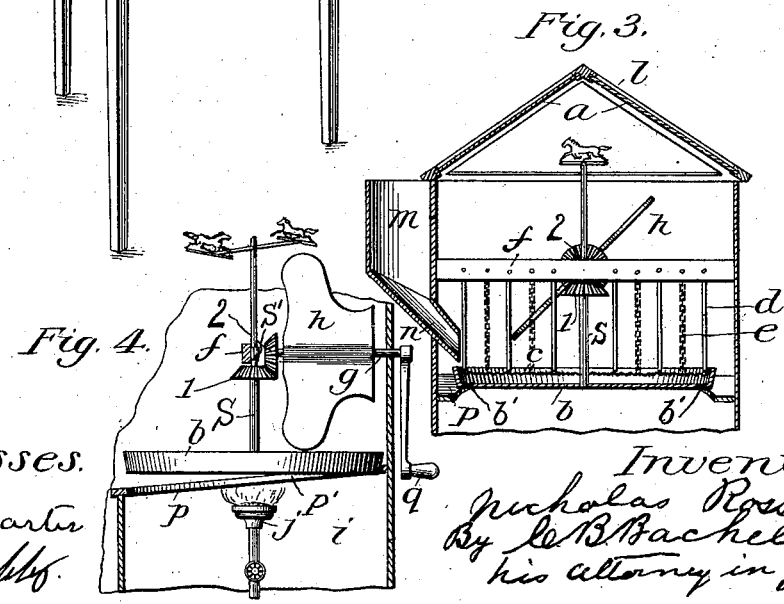
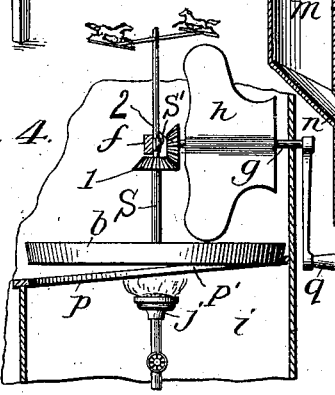
Witnesses.      Inventor.
L. M. Carter      Nicholas Rossi
W. E. Dally      By C. B. Bacheller,
         his attorney in fact.

United States Patent Office.

NICHOLAS ROSSI, OF EMPORIA, KANSAS.

POPCORN-POPPER.

SPECIFICATION forming part of Letters Patent No. 588,186, dated August 17, 1897.

Application filed January 2, 1897. Serial No. 617,854. (No model.)

*To all whom it may concern:*

Be it known that I, NICHOLAS ROSSI, a citizen of the United States of America, residing at Emporia, in the county of Lyons, in the State of Kansas, have invented a new and useful Popcorn-Popper, of which the following is a specification.

My invention has relation to improvements in machines for popping corn; and the object is to provide a machine or means by which the raw corn may be roasted or popped expeditiously and completely.

I have fully and clearly illustrated the invention in the accompanying drawings, wherein—

Figure 1 is a perspective view of the complete device or apparatus. Fig. 2 is a perspective view showing the cover raised and the door open. Fig. 3 is a detail sectional view of the popping-receptacle and the agitating mechanism. Fig. 4 is a detail side view, partly in section, of the pan and actuating mechanism.

A designates the casing, consisting of a suitable frame and closure, having in it panes of glass $a$ and provided with a door $k$, substantially as shown in Figs. 1 and 2 of the drawings. The casing is provided with a cover $l$, preferably pyramidal in shape and having glass panes $a$ secured therein. In the rear portion $i$ of the casing, at a proper place below the popping-pan, is secured a forwardly-inclined plate $p$, down which the discharged popped corn runs into the lower front part of the casing and is held as indicated. This incline $p$ has an opening $p'$ in the central portion, so that the flame of the heating-jet may have unobstructed access to and effect upon the bottom of the popping-pan. The heat may be applied by means of a gas-jet or by gasolene. I have shown for this purpose a gasolene-reservoir $r$, having the usual conduit-pipe leading therefrom and across the casing and provided with a burner $j$, arranged under the popping-pan.

$b$ designates the popping-pan, provided with openings $b'$ in the bottom, located adjacent to the edge thereof, to permit any particles sifting through the wire screen to fall through and be deposited in the rear part $i$ of the casing. In the middle of the bottom of the popping-pan is fixed the lower end of a vertical shaft $s$, held in a bearing $s'$, secured on a cross piece or bar $f$, arranged and secured across the casing above the popping-pan, the shaft $s$ being extended vertically, as shown, and on the upper end may be a cross-bar carrying any ornamental images, as indicated in the drawings. In the pan $b$ is suitably supported a wire screen $c$, arranged above the bottom, and on which the popping corn is sustained during the process of popping, the location of the screen preventing the too direct application of the heat.

Transversely arranged and secured across the casing and at a suitable distance above the pan is a cross piece or bar $f$, having fixed therein depending bars or fingers $d$, the lower ends of which reach into the pan and stop short of and free from the wire screen, and between these fingers $d$ are arranged depending chains $e$, having their upper ends fastened to the cross-piece $f$, the chains being of such a length as to sweep over the wire screen. These fingers $d$ and chains $e$ constitute the means for stirring or agitating the contents of the pan.

On the shaft $s$ is mounted a bevel-gear 1, which is engaged by a bevel-gear 2, mounted on a horizontally-arranged shaft $g$, having its outer end extending beyond the casing and provided with a handle $q$, by which the shaft is turned and rotation is imparted to the pan. On the shaft $g$ are secured rotary blades $h$, the arms of which sweep over the pan and move or carry the popped corn therefrom onto the incline $p$, from whence it runs down into the front part of the casing. On the outside is fixed a corn-hopper $m$, provided with a spout $n$, leading from the bottom of the hopper and opening into the pan, whereby the loose raw corn deposited in the hopper is conducted into the pan. A partition-plate 3 supports the inner edge of the inclosure $p$ and divides the receptacle $i$ from the front part of the casing wherein the popped corn is contained.

The operation of the apparatus is as follows: The hopper being supplied with raw shelled corn, it is fed into the pan through the spout. The heating appliance then is put in operation, and when the corn begins to "pop" the pan is rotated, the blades on the shaft striking the popped grains onto the incline, the remaining contents of the pan being continually agitated and stirred by the fingers and chains which extend into the contents.

Having thus described my invention, what I claim, and desire to secure by Letters Patent, is—

1. In a corn-popper, the combination of a suitable casing, a horizontally-rotative pan in the casing, a wire screen in the pan, a cross-piece over the pan, stirring-fingers in the cross-piece and reaching into the pan, and means to rotate the pan.

2. In a corn-popper, the combination of a suitable casing, a horizontally-rotative pan in the casing, a wire screen in the pan, a cross-piece over the pan, stirring-fingers in the cross-piece and reaching into the pan, chains depending from the cross-piece into the pan, and means to rotate the pan.

3. In a corn-popper, the combination of a suitable casing, a horizontally-rotative pan in the casing, a wire screen in the pan, a cross-piece above the pan, stirrers depending from the cross-piece into the pan, rotating blades to throw the popped corn from the pan, and an incline under the pan to carry the popped corn into the casing, means to rotate the pan and blades, and a heating appliance to heat the pan.

4. A corn-popper comprising a suitable casing, a horizontally-rotative pan in the casing, a wire screen in the pan, a hopper having a spout opening into the pan, a cross-piece over the pan, stirring-fingers depending from the cross-piece into the pan, rotating blades to throw the popped corn from the pan, an incline under the pan, and means to rotate the pan, and the said blades.

NICHOLAS ROSSI.

Witnesses:
W. J. IDLEMAN,
CHAS. F. HILL.